US007171417B2

(12) United States Patent
Chen et al.

(10) Patent No.: US 7,171,417 B2
(45) Date of Patent: Jan. 30, 2007

(54) METHOD AND APPARATUS FOR IMPROVING PERFORMANCE AND SCALABILITY OF AN OBJECT MANAGER

(75) Inventors: Ping Chen, Austin, TX (US); Robert Kimberlin Foster, Austin, TX (US); Joy Mei-Jen Underhill, Round Rock, TX (US); Christine I. Wang, Pflugerville, TX (US); Quan Wang, Austin, TX (US); Xiaodong Xia, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 10/675,741

(22) Filed: Sep. 30, 2003

(65) Prior Publication Data
US 2005/0071363 A1 Mar. 31, 2005

(51) Int. Cl.
*G06F 17/30* (2006.01)
(52) U.S. Cl. ...................................................... 707/10
(58) Field of Classification Search ............. 707/1–10, 707/100–104.1, 200–206; 709/223; 345/765
See application file for complete search history.

(56) References Cited

U.S. PATENT DOCUMENTS

| 7,020,697 | B1* | 3/2006 | Goodman et al. .......... 709/223 |
| 2002/0059291 | A1 | 5/2002 | Rossiter et al. ............. 707/102 |
| 2002/0091809 | A1 | 7/2002 | Menzies et al. ............ 709/223 |
| 2002/0091819 | A1 | 7/2002 | Melchione et al. ......... 709/224 |
| 2002/0108102 | A1 | 8/2002 | Muhlestein et al. ........ 717/124 |
| 2003/0004963 | A1 | 1/2003 | Kagalwala et al. ...... 707/103 R |
| 2003/0033379 | A1 | 2/2003 | Civanlar et al. ............ 709/218 |
| 2003/0055862 | A1 | 3/2003 | Bhat .......................... 709/101 |
| 2003/0055948 | A1 | 3/2003 | Wang ......................... 709/224 |
| 2003/0058277 | A1* | 3/2003 | Bowman-Amuah ......... 345/765 |
| 2003/0105838 | A1 | 6/2003 | Presley ....................... 709/220 |
| 2003/0112232 | A1 | 6/2003 | Georgalas ................... 345/418 |
| 2006/0059253 | A1* | 3/2006 | Goodman et al. .......... 709/223 |

FOREIGN PATENT DOCUMENTS

EP   1 061 446 A2   12/2000

OTHER PUBLICATIONS

Distributed Management Task Force, Inc., "Common Information Model (CIM) Specification", Version 2.2, Jun. 14, 1999, pp. 1-97.

* cited by examiner

*Primary Examiner*—Diane Mizrahi
(74) *Attorney, Agent, or Firm*—Duke W. Yee; Thomas E. Tyson; Lisa L. B. Yociss

(57) ABSTRACT

A method, apparatus, and computer instructions for improving performance and scalability of common information model object (CIMOM) by using a hardware management console (HMC) repository. The HMC repository includes storage of HMC objects, an HMC object model and a common interface (CIM Wrapper) for accessing to HMC objects. The HMC object model allows the user to store and retrieve the CIM objects and their associations efficiently. A CIM provider may access HMC objects through a common interface (CIM Wrapper), so that different repositories are allowed to be used without significant changes to the underlying server code (CIM provider). A CIM provider may also call the HMC repository directly for more efficient operations because the number of times conversions made between the CIM object and the repository object are greatly decreased.

24 Claims, 5 Drawing Sheets

METHOD AND APPARATUS FOR IMPROVING PERFORMANCE AND SCALABILITY OF AN OBJECT MANAGER

BACKGROUND OF THE INVENTION

1. Technical Field

The present invention relates generally to an improved data processing system and in particular to a method and system for improving performance and scalability of a logical partitioned platform in a data processing system. Still more particularly, the present invention relates to a method, apparatus, and computer instructions for improving performance and scalability of common information model object manager (CIMOM) using a hardware management console (HMC) repository.

2. Description of Related Art

The common information model (CIM) is an open standard from the Distributed Management Task Force (DMTF) that manages systems and networks. CIM defines a set of classes with properties and associations which in turn provide a conceptual framework applicable to all areas of management including systems, applications, databases, networks, and devices. The framework enables the organization of data for a specific managed environment, such as the hardware management console (HMC), a product available from International Business Machine (IBM) Corporation. HMC is a data processing system that allows a system administrator to control operations of different logical partitions in a logical partitioned platform environment. The HMC allows the system administrator to perform hardware management functions such as, for example, reallocation of resources to different logical partitions, activating partitions, and hard reset of partitions.

An implementation of CIM, known as common information model object manager (CIMOM), takes the form of a CIM server that receives, validates, and authenticates client application requests. CIMOM directs the requests to the appropriate functional component or to an application provider. In addition, CIMOM provides a repository for storage of management data. Currently, CIMOM uses a generic mechanism to handle queries for retrieving CIM objects from the repository. For example, all of the CIM objects are currently stored in one single table, which is very inefficient when retrieving objects. Accordingly, the currently existing CIMOM repository does not meet the performance and scalability requirements of a management system, such as HMC.

Therefore, it would be advantageous to have an improved method, apparatus, and computer instructions for improving performance and scalability of CIMOM so that access to the managed objects in the repository may be faster, and storage of managed objects requires a smaller footprint in the repository. In addition, it would also be advantageous to have an improved method that allows different repositories to be used without significant changes to the underlying server code.

SUMMARY OF THE INVENTION

The present invention provides a method, apparatus, and computer instructions for improving performance and scalability of CIMOM when requests are sent from the client application to retrieve CIM objects for hardware management console (HMC). A HMC repository is used to store, retrieve, and define CIM objects and their associations in a CIM Server. The HMC repository includes a model that allows the user to store and retrieve the CIM objects and their associations efficiently. A CIM provider may provide access to HMC objects through a common interface (CIM Wrapper), so that different repositories are allowed to be used without significant changes to the underlying server code (CIM provider). A CIM provider may also call the HMC repository directly for more efficient operations because the number of times conversions made between the CIM object and the repository object are greatly decreased.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
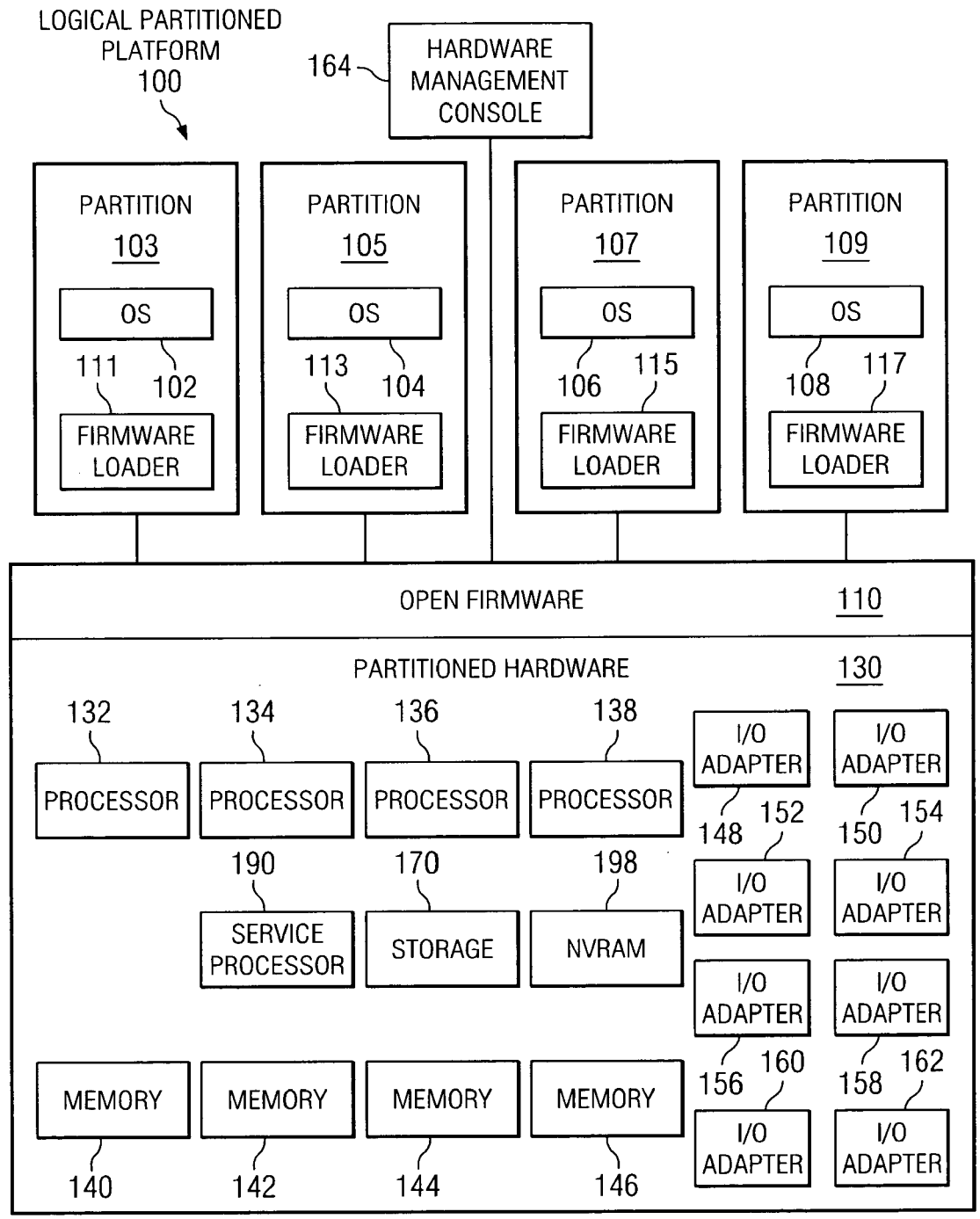
FIG. 1 is a block diagram of an exemplary logical partitioned platform according to a preferred embodiment of the present invention.

With reference now to the figures and in particular with reference to FIG. 1, a block diagram of an exemplary logical partitioned platform is depicted according to a preferred embodiment of the present invention. Logical partitioned platform 100 is an example of a data processing system that may be managed using the mechanism of the present invention. Logical partitioned platform 100 includes partitioned hardware 130, operating systems 102, 104, 106, 108, and hypervisor 110. Operating systems 102, 104, 106, and 108 may be multiple copies of a single operating system or multiple heterogeneous operating systems simultaneously executing on logical partitioned platform 100. These operating systems may be implemented using OS/400, which are designed to interface with a hypervisor. Operating systems 102, 104, 106, and 108 are located in partitions 103, 105, 107, and 109.

Additionally, these partitions also include firmware loaders 111, 113, 115, and 117. Firmware loaders 111, 113, 115, and 117 may be implemented using IEEE-1275 Standard Open Firmware and runtime abstraction software (RTAS), which is available from International Business Machines Corporation. When partitions 103, 105, 107, and 109 are instantiated, a copy of the open firmware is loaded into each partition by the hypervisor's partition manager. The processors associated or assigned to the partitions are then dispatched to the partition's memory to execute the partition firmware.

Partitioned hardware 130 includes a plurality of processors 132–138, a plurality of system memory units 140–146, a plurality of input/output (I/O) adapters 148–162, and a storage unit 170. Partitioned hardware 130 also includes service processor 190, which may be used to provide various services, such as the processing of errors in the partitions. Each of the processors 132–138, memory units 140–146, NVRAM storage 198, and I/O adapters 148–162 may be assigned to one of multiple partitions within logical partitioned platform 100, each of which corresponds to one of operating systems 102, 104, 106, and 108.

Partition management firmware (hypervisor) 110 performs a number of functions and services for partitions 103, 105, 107, and 109 to create and enforce the partitioning of logical partitioned platform 100. Hypervisor 110 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 110 allows the simultaneous execution of independent OS images 102, 104, 106, and 108 by virtualizing all the hardware resources of logical partitioned platform 100.

Operations of the different partitions may be controlled through a hardware management console, such as console 164. Console 164 is a separate data processing system from which a system administrator may perform various functions including reallocation of resources to different partitions.

Figure 2:
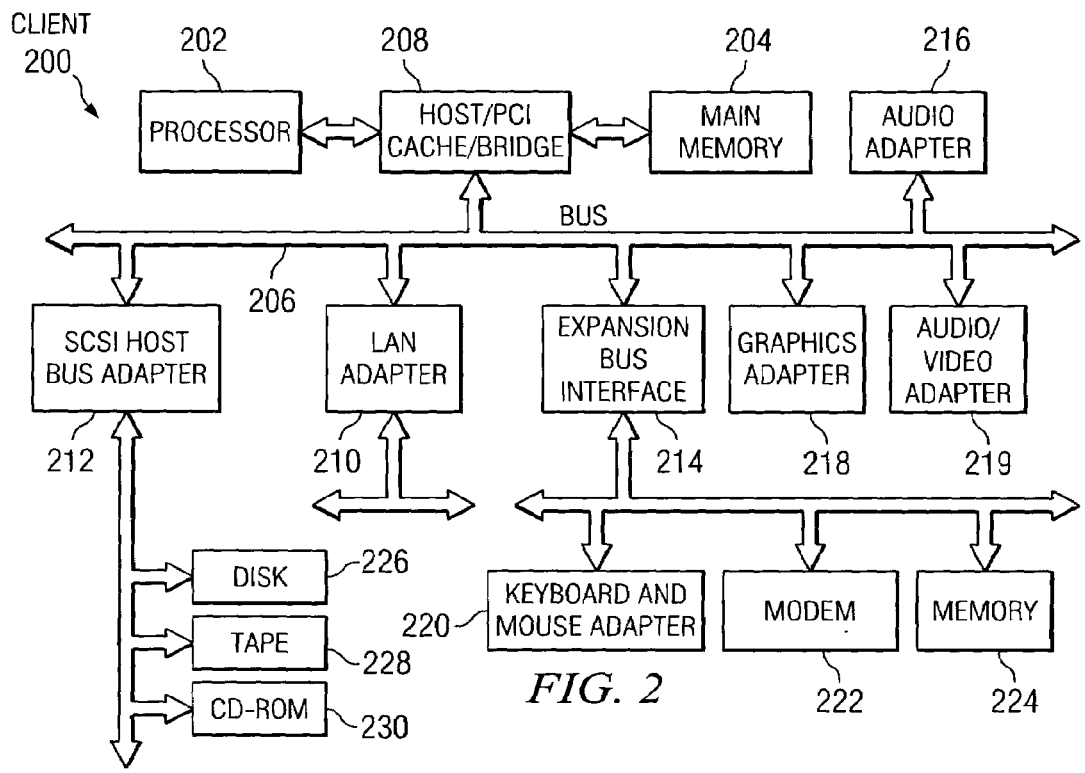
FIG. 2 is a block diagram illustrating a data processing system in which the present invention may be implemented.

With reference now to FIG. 2, a block diagram illustrating a data processing system is depicted in which the present invention may be implemented. Data processing system 200 is an example of a hardware management console (HMC). Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The present invention provides a method, apparatus, and computer instructions for improving performance and scalability of a common information model object manager (CIMOM) using a hardware console management (HMC) repository. The HMC repository includes a set of objects, which are defined by the RObject class. An RObject represents an HMC object or a common information model (CIM) object, such as, for example, a partition, a computer system, a partition profile, or an I/O drawer slot. An RObject belongs to a CIM class, which has a corresponding definition in the HMC repository. Such a definition is a singleton class and is called HMC object schema, which inherits from the RClassSchema class. The RClassSchema class defines the generic attributes of any HMC object schema, while an HMC object schema, referring to a particular CIM class, defines specific attributes of the CIM class, such as the property names and key properties. For example, HMC object schema RComputerSystem has properties such as "Name", "CreationClassName", "RuntimeCapability", etc., and the key properties are "Name" and "CreationClassName". The common attributes defined in RClassSchema are CIM class name, class ID, a mapping table of the CIM property index, and the CIM property name. Property values of a CIM object are stored in an array in an RObject. Array indexes are the CIM property indexes defined in each HMC object schema. Array indexes are used to represent the corresponding CIM properties. CIM property indexes are used to directly access to the CIM property values.

The HMC repository of the present invention also uses a set of association schemas that define association links between RObjects. An association schema is an instance of the RAssoSchema class. This schema defines a CIM association in the HMC repository, such that each CIM association has a corresponding HMC association schema in the HMC repository.

RObjectId is a class representing an object ID to an RObject. To reference an RObject, an RObjectId is used in the HMC repository. An RObjectId, containing only the key properties, can uniquely identify its corresponding RObject, while the RObjectId has a much smaller size on average than the RObject. An association link can be specified with an RObjectId stored in an RObject. RObjectIds are stored in a vector of an RObject to specify links associated to a particular CIM class.

The use of RObjects requires a smaller footprint than existing CIM objects. Currently, an example CIM computer system object may take about 25 kilobytes in CIMOM internal repository. The same object may take up only about 1 kilobyte of space in the HMC repository. In addition, all RObjects under the same CIM class are referenced in the same hash table and in particular to the CIM class. RObjects under different CIM classes go to different hash tables. In other words, table mapping of RObject identifiers to an RObject is "CIM Class" based with each CIM class (HMC Object Schema) having one such table. The RObject hash table has RObjectId as the key, and RObject as the value. Compared to the existing CIMOM internal repository implementation, the design in the present invention allows faster and efficient operations.

Furthermore, the HMC repository, in these illustrative examples, provides for conversions between HMC objects and associations to CIM objects through a set of CIMOM wrapper methods. These methods overwrite the existing CIMOM wrapper methods to provide the same interfaces for the client application, so that changes to the underlying CIMOM server code are not required. These methods also allow use of a different repository.

Figure 3:
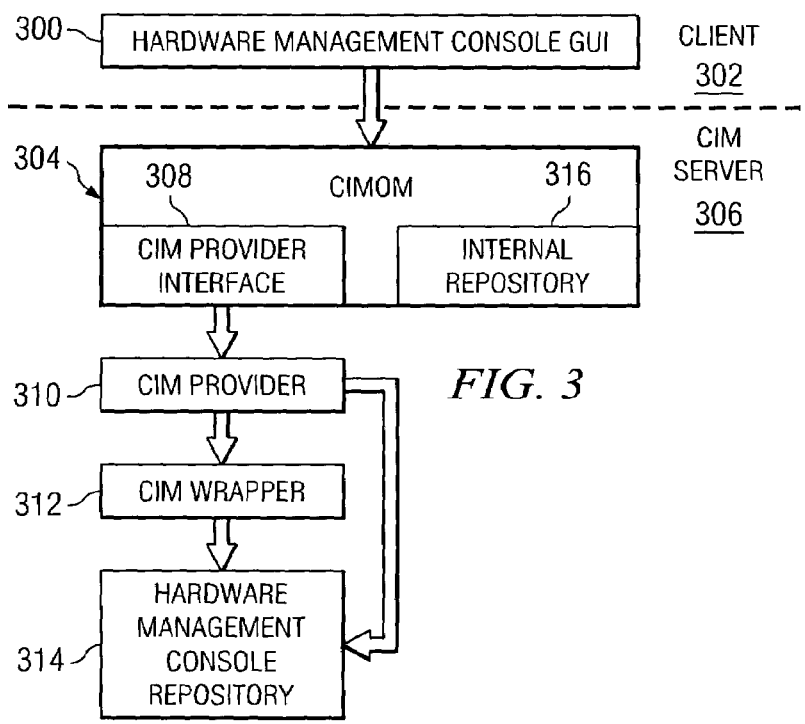
FIG. 3 is a diagram illustrating components for improving performance and scalability of CIMOM using an HMC repository in accordance with a preferred embodiment of the present invention.

Turning now to FIG. 3, a diagram illustrating components for improving performance and scalability of CIMOM using an HMC repository is depicted in accordance with a preferred embodiment of the present invention. As depicted in FIG. 3, in this illustrative implementation, HMC graphical user interface (GUI) 300 may be a client application running on client 302 such as data processing system 200 in FIG. 2. HMC GUI 300 may send requests to the CIMOM 304 residing on the CIMOM server 306 to retrieve CIM objects. CIMOM 304 includes server code that provides an interface to HMC GUI 300. CIMOM also includes CIM provider interface 308 that connects the server code from CIMOM 304 to CIM provider 310. CIM provider 310 is an application provider that includes HMC CIM server code to send client requests to a repository. The CIM provider 310 in turns calls the CIM wrapper 312, which provides a set of methods that allow a different repository, such as, for example, HMC repository 314, to be queried without modifying underlying server code. Conventionally, internal repository 316 located in CIMOM 304 is used to hold CIM objects.

Figure 4A:
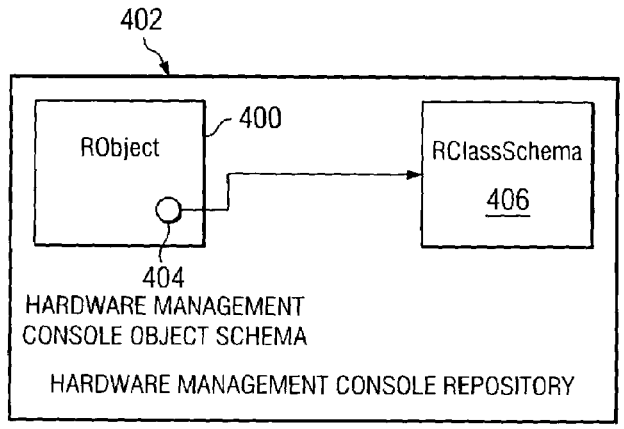
FIG. 4A is a diagram illustrating components RObject and RClassSchema in an HMC repository in accordance with a preferred embodiment of the present invention.

Turning next to FIG. 4A, a diagram illustrating components RObject and RClassSchema in a HMC repository is depicted in accordance with a preferred embodiment of the present invention. As depicted in FIG. 4A, RObject class 400 is defined in HMC repository 402. RObject class 400 defines common properties and methods shared among HMC objects in HMC repository 400. HMC Object Schema 404, a property of an RObject 400, indicates the CIM class of an RObject 400. An HMC object schema is a singleton class that inherits from the abstract schema class RClassSchema 406, which defines the common properties of any HMC object schema. Example of HMC object schemas are RComputerSystem, RPartition, or RIODrawer. They represent computer systems, partitions, and I/O drawers. Each RObject 400 is mapped to a CIM object of a CIM class.

The common properties of HMC object schemas defined in RClassSchema 406 are CIM class name, class ID, a mapping table of the CIM property index, and the CIM property name.

Property values of a CIM object are stored in an array in an RObject. Array indexes are the CIM property indexes defined in each HMC object schema. Array indexes are used to represent the corresponding CIM properties. CIM property indexes are used to access to the CIM property values. For example, instead of using a string constant "PartitionState", a method call getProperty("PartitionState") can be replaced with getProperty(PartitionStateIndex), where PartitionStateIndex is a numeric type.

Figure 4B:
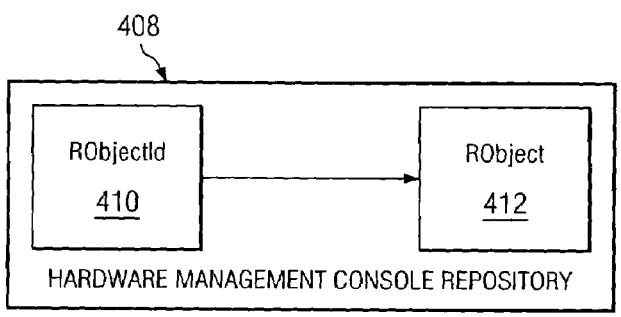
FIG. 4B is a diagram illustrating components RObjectId and RObject in an HMC repository in accordance with a preferred embodiment of the present invention.

Turning next to FIG. 4B, a diagram illustrating RObjectId and RObject in an HMC repository is depicted in accordance with a preferred embodiment of the present invention. As depicted in FIG. 4B, RObjectId 410 is used to represent RObject 412 in HMC repository 408. The RObjectId 412 includes only key properties of the RObject 412, and has a reference to the schema of the RObject 412. In short, RObjectId 410 is the name of the RObject 412. One RObjectId uniquely identifies an RObject. In HMC repository 408, RObjectIds are used to represent association links in RObjects. RObjectIds are stored in a vector of an RObject to specify links associated to a particular HMC object schema.

Figure 4C:
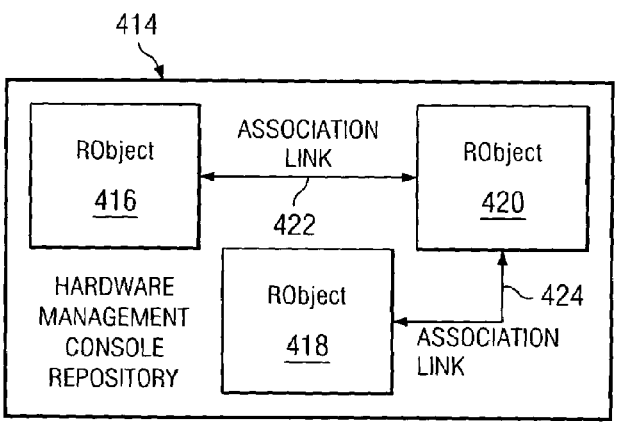
FIG. 4C is a diagram illustrating RObjects and association links in an HMC repository in accordance with a preferred embodiment of the present invention.

Turning next to FIG. 4C, a diagram illustrating RObjects and association links in an HMC repository is depicted in accordance with a preferred embodiment of the present invention. As depicted in FIG. 4C, three HMC objects are represented as RObject 416, 418, and 420 in HMC repository 414. In this example, RObject 420 represents a computer system and RObjects 416 and 418 each represents a partition. Association link 422 associates RObject 416 with RObject 420 and association link 424 associates RObject 418 with RObject 420. Association link 422 and association link 424 represent associations between the two partitions and the computer system in this illustrative example.

Figure 4D:
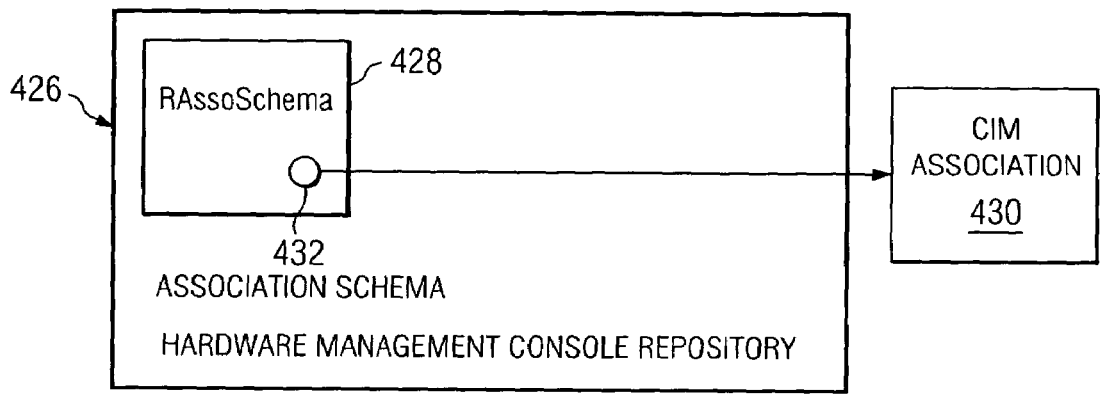
FIG. 4D is a diagram illustrating component RAssoSchema and CIM association in an HMC repository in accordance with a preferred embodiment of the present invention.

In FIG. 4D, a diagram illustrating component RAssoSchema and CIM association in an HMC repository is depicted in accordance with a preferred embodiment of the present invention. As shown in FIG. 4D, RAssoSchema class 428 is defined in HMC repository 426. RAssoSchema class 428 defines attributes of the association schema 432. Attributes of association schema 432 include, for example, the referenced HMC class IDs and the reference names. Association schema 432 is an instance of RAssoSchema 428 and has a reference to CIM association 430. CIM association 430 is a CIM class that defines associations between CIM objects.

Figure 5:
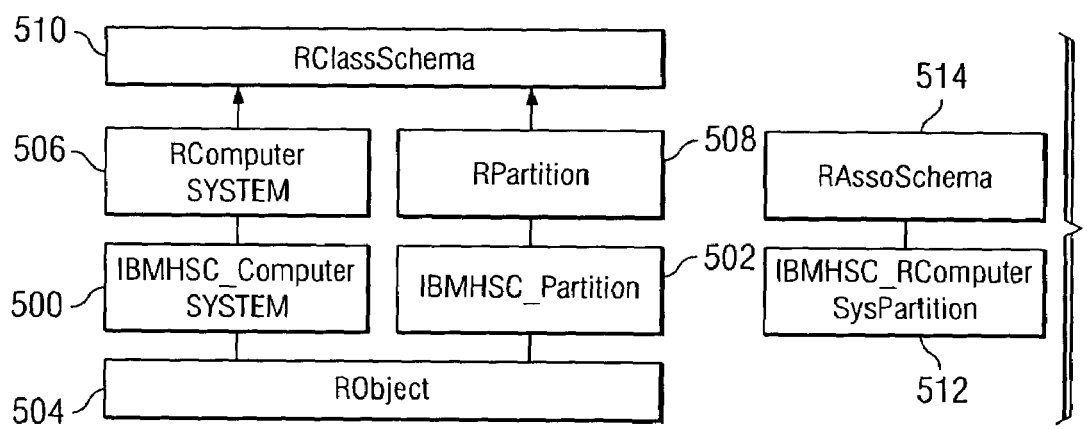
FIG. 5 is a diagram illustrating an example implementation of an HMC repository components in accordance with a preferred embodiment of the present invention.

Turning next to FIG. 5, a diagram illustrating an example implementation of an HMC repository component is depicted in accordance with a preferred embodiment of the present invention. As depicted in FIG. 5, in this illustrative implementation, HMC objects IBMHSC_ComputerSystem 500 and IBMHSC_Partition 502 are instances of RObject 504 that describe a computer system and a partition. The schema for IBMHSC_ComputerSystem 500 is defined in RComputerSystem object 506 and the schema for IBMH- SC_Partition 502 is defined in RPartition object 508. Both RComputerSystem 506 and RPartition 508 inherit from RClassSchema 510 class, where common properties and methods for RObjects are defined.

Association Schema RComputerSysPartition 512, representing the CIM association IBMHSC_ComputerSysPartition in the HMC repository, defines the association between IBMHSC_ComputerSystem 500 and IBMHSC_Partition 502 objects, which may represent a partition of a computer system. Association Schema RComputerSysPartition 512 is an instance of RAssoSchema 514, where attributes of the association are defined. By using the above example implementation, any changes to the definition of the CIM objects and associations, are easily implemented by changing the definition of the corresponding schema in the HMC repository.

Figure 6:
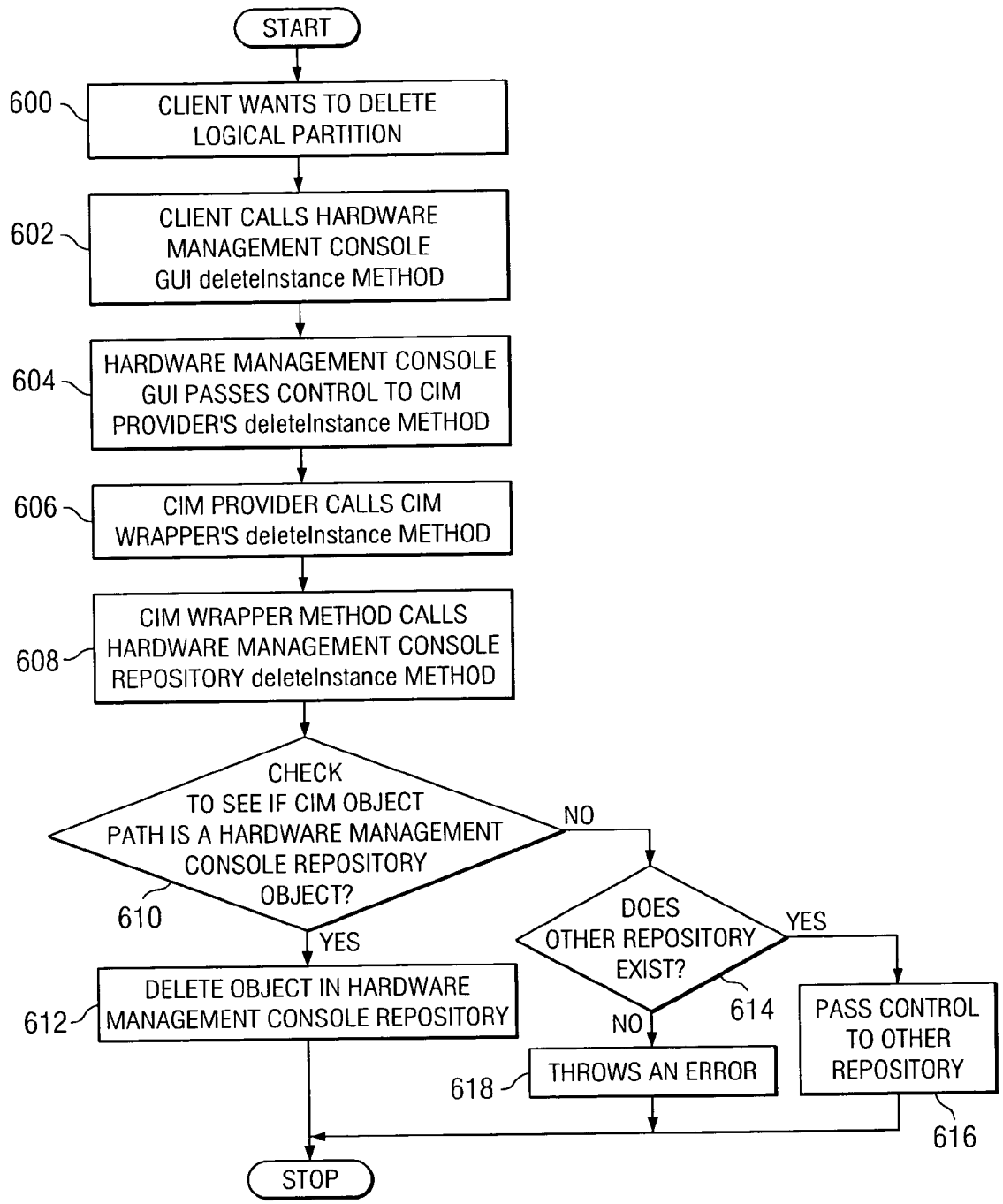
FIG. 6 is a flowchart of a process of an example client request for deleting a logical partition in the HMC repository in accordance with a preferred embodiment of the present invention.

With reference to FIG. 6, a flowchart of a process of an example client request for deleting a logical partition in the HMC repository is depicted in accordance with a preferred embodiment of the present invention. As depicted in FIG. 6, in this illustrative implementation, the process begins when the client wants to delete a logical partition (step 600). The client calls the HMC GUI's deleteinstance method (step 602) with a CIM object path that identifies the CIM object instance in the HMC repository.

Next, the HMC GUI calls the CIMOM Interface and passes the control over to the CIM provider's deleteinstance method on the CIM server (step 604). The CIM provider, in this example, is an instance provider that provides methods to get, set, delete, and create instances of CIM objects. The CIM provider then calls the CIM wrapper's deleteinstance method (step 606). However, instead of calling the internal repository to delete the instance as it currently exists in the prior art, the CIM wrapper now calls the HMC repository's deleteinstance method (step 608).

Upon receiving the call, a determination is made by the CIM Wrapper as to whether the CIM object path is a HMC repository object (step 610). If the CIM object path represents an HMC repository object, the HMC repository deletes the object (step 612) and the process terminates thereafter.

With reference again to step 610, however, if the CIM object path is not an HMC repository object, a determination is made as to whether other repository exists (step 614). If other repository exists, the CIM Wrapper gives control to other repository (step 616) and the process terminates thereafter. If no other repository exists, the CIM Wrapper throws an error to notify the client that the object is not found (step 618) and the process terminates thereafter.

Figure 7:
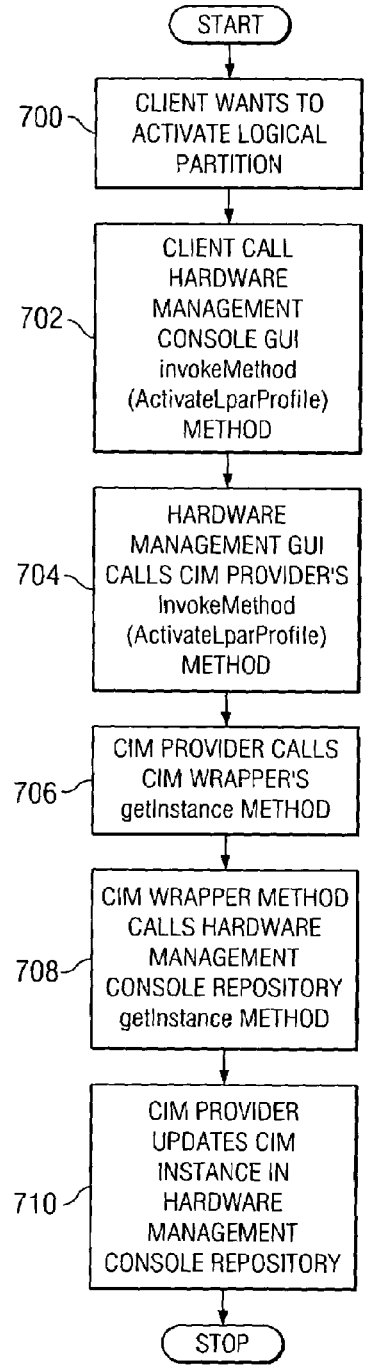
FIG. 7 is a flowchart of a process of example client request for activating a logical partition in the HMC repository in accordance with a preferred embodiment of the present invention.

Turning next to FIG. 7, a flowchart of a process of an example client request for activating a logical partition in the HMC repository is depicted in accordance with a preferred embodiment of the present invention. As depicted in FIG. 7, in this illustrative implementation, the process begins when the client wants to activate a logical partition (step 700). The client calls the HMC GUI invokeMethod and provides an ActivateLparProfile parameter (step 702) which is the method name to be invoked by the method provider.

The HMC GUI then calls the CIMOM Interface and pass the control over to the CIM provider's invokeMethod with the ActivateLparProfile parameter on the CIM server (step 704). The CIM provider, in this example, is a method provider that provides methods for application defined operations such as rebuild CEC, activate profile, hard reset partition, power off CEC, etc. The method provider then invokes the CIM wrapper's getInstance method (step 706) using the CIM object path. The CIM wrapper in turn calls the HMC repository's getInstance method (step 708) to retrieve the partition instance from the HMC repository for activation. Once the partition instance is retrieved, the CIM provider updates the partition instance in the HMC repository (step 710) and the process terminates thereafter.

Thus, the present invention improves the performance and scalability of CIMOM by using an HMC repository architecture that provides direct access to CIM objects by including a set of RObjects and their attributes with a RClassSchema. Association links between CIM objects may also be accessed in the HMC repository by defining a RAssoSchema class. Hence, fast access to CIM objects is achieved by using RObject classes and association links in the HMC repository.

In addition, the HMC repository provides CIM wrapper methods that allow objects and association links in the HMC repository to be wrapped in CIM objects, so that HMC objects are transparent to the client and the underlying server code may remain the same. This mechanism also enables a different repository other than an HMC repository to be used. Furthermore, the HMC repository requires a smaller footprint to store objects than existing CIM objects.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs.

The description of the present invention has been M presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a common information model (CIM) server computer system for managing objects, the CIM server computer system including storage and a common information model object manager (CIMOM) processing environment that includes an internal repository, method calls to the storage being executed by methods that are currently stored in the storage, an existing set of methods being currently stored in the storage, the existing set of methods for manipulating first objects that are included in the internal repository, wherein current method calls to the storage manipulate first objects that are stored in the internal repository, the method comprising:

creating, by the CIM server computer system, a second repository, the second repository external to the CIMOM processing environment;

the second repository including second objects representing components for a logically partitioned data processing system, wherein the second objects are grouped by class into a set of classes, wherein associations between the second objects are links within the second repository;

manipulating the second objects using a second set of methods;

transforming the storage by overwriting the existing set of methods in the storage with the second set of methods;

receiving a request from a requestor that includes a method call to the storage; and executing one of the second set of methods causing one of the second objects to be manipulated, wherein method calls to the storage manipulate the second objects instead of the first objects.

2. The method of claim 1, wherein the request is for a selected format and further comprising:

converting at least one second object into the selected format to form at least one converted second object; and returning the converted second object to the requestor.

3. The method of claim 2, wherein the selected format is a common information model (CIM) standard.

4. The method of claim 2, wherein the converting step is performed by the second repository.

5. The method of claim 1, wherein the second objects include at least a computer system, a partition, a partition profile, an input/output slot, a processor, and a memory.

6. The method of claim 1, wherein the request is received from a common information manager (CIM) provider.

7. The method of claim 1, wherein the step of executing one of the second set of methods causing one of the second objects to be manipulated includes at least one of retrieving the one of the second objects, creating the one of the second objects, deleting the one of the second objects, and updating the one of the second objects.

8. An object management system in a common information model (CIM) server computer system that includes storage and a common information model object manager (CIMOM) processing environment that includes an internal repository, method calls to the storage executed by methods that are currently stored in the storage, an existing set of methods being currently stored in the storage, the existing set of methods for manipulating first objects that are included in the internal repository, wherein current method calls to the storage manipulate first objects that are stored in the internal repository, comprising:

a second repository that is created in the CIM server computer system by the object management system, the second repository external to the CIMOM processing environment;

the second repository including second objects representing components for a logically partitioned data processing system, wherein the second objects are grouped by class into a set of classes, wherein associations between the second objects are links within the second repository;

a second set of methods for manipulating the second objects;

the storage being transformed by overwriting the existing set of methods in the storage with the second set of methods;

an object manager for receiving a request from a requestor that includes a method call to the storage; and an interface for executing one of the second set of methods causing one of the second objects to be manipulated, wherein method calls to the storage manipulate the second objects instead of the first objects.

9. The object management system of claim 8, wherein the interface comprises:

a provider, wherein the provider handles requests relating to a logical partitioned data processing system; and wherein the storage is a wrapper, wherein the wrapper provides an interface for the provider to different types of repositories, including the internal repository and the second repository.

10. The object management system of claim 8, wherein methods and properties for the first and second objects are defined in a schema class, which inherits from RClassSchema.

11. The object management system of claim 8, wherein the first and second objects are defined using an RObject class.

12. The object management system of claim 11, wherein the links are included in the RObject class.

13. The object management system of claim 11, wherein property values are stored in an array in an RObject in the RObject class, wherein the array indexes are used to directly access the property values.

14. The object manager system of claim 11, wherein table mapping of an RObject identifier to an RObject is "CIM Class" based with each CIM Class having one table.

15. A common information model (CIM) server computer system for managing objects, the CIM server computer system including storage and a common information model object manager (CIMOM) processing environment that includes an internal repository, method calls to the storage being executed by methods that are currently stored in the storage, an existing set of methods being currently stored in the storage, the existing set of methods for manipulating first objects that are included in the internal repository, wherein current method calls to the storage manipulate first objects that are stored in the internal repository, the CIM server computer system comprising:

creating means for creating a second repository in the CIM server computer system, the second repository external to the CIMOM processing environment;

the second repository including second objects representing components for a logically partitioned data processing system, wherein the second objects are grouped by class into a set of classes, wherein associations between the second objects are links within the second repository;

manipulating means for manipulating the second objects using a second set of methods;

transforming means for transforming the storage by overwriting the existing set of methods in the storage with the second set of methods;

receiving means for receiving a request from a requestor that includes a method call to the storage; and executing means for executing one of the second set of methods causing one of the second objects to be manipulated, wherein method calls to the storage manipulate the second objects instead of the first objects.

16. The CIM server computer system of claim 15, wherein the request is for a selected format and further comprising:

converting means for converting at least one second object into the selected format to form at least one converted second object; and returning means for returning the converted second object to the requestor.

17. The CIM server computer system of claim 16, wherein the selected format is a common information model (CIM) standard.

18. The CIM server computer system of claim 16, wherein the converting means is performed by the second repository.

19. The CIM server computer system of claim 15, wherein the second objects include at least a computer system, a partition, a partition profile, an input/output slot, a processor, and a memory.

20. A computer program product that is stored in a computer readable storage medium for managing objects, in a common information model (CIM) server computer system, the CIM server computer system including storage and a common information model object manager (CIMOM) processing environment that includes an internal repository, method calls to the storage being executed by methods that are currently stored in the storage, an existing set of methods being currently stored in the storage, the existing set of methods for manipulating first objects that are included in the internal repository, wherein current method calls to the storage manipulate first objects that are stored in the internal repository, the computer program product comprising:

first instructions for creating a second repository that is external to the CIMOM processing environment;

the second repository including second objects representing components for a logically partitioned data processing system, wherein the second objects are grouped by class into a set of classes, wherein associations between the second objects are links within the second repository;

second instructions for manipulating the second objects using a second set of methods;

third instructions for transforming the storage by overwriting the existing set of methods in the storage with the second set of methods;

fourth instructions for receiving a request from a requestor that includes a method call to the storage; and fifth instructions for executing one of the second set of methods causing one of the second objects to be manipulated, wherein method calls to the storage manipulate the second objects instead of the first objects.

21. The computer program product of claim 20, wherein the request is for a selected format and further comprising:

sixth instructions for converting at least one second object into the selected format to form at least one converted second object; and seventh instructions for returning the converted second object to the requestor.

22. The computer program product of claim 21, wherein the selected format is a common information model standard.

23. The computer program product of claim 21, wherein the converting step is performed by the second repository.

24. The computer program product of claim 20, wherein the second objects include at least a computer system, a partition, a partition profile, an input/output slot, a processor, and a memory.

* * * * *